(12) United States Patent
Scarr et al.

(10) Patent No.: US 10,190,537 B2
(45) Date of Patent: Jan. 29, 2019

(54) ENGINE AND BAND CLAMP

(71) Applicant: MRA Systems, Inc., Baltimore, MD (US)

(72) Inventors: Antony Brett Scarr, Baltimore, MD (US); Thomas Joseph Weir, Baltimore, MD (US); Allen Madsen Woolley, Rose Hill, KS (US); Brian Kelby Clegg, Baltimore, MD (US); Michael Scott Just, Baltimore, MD (US); Robert Paul Klingele, New Britain, PA (US); David Solberg, Baltimore, MD (US)

(73) Assignee: MRA Systems, Inc., Baltimore, MD (US)

( * ) Notice: Subject to any disclaimer, the term of this patent is extended or adjusted under 35 U.S.C. 154(b) by 272 days.

(21) Appl. No.: 14/901,449

(22) PCT Filed: Jul. 2, 2013

(86) PCT No.: PCT/US2013/049041
§ 371 (c)(1),
(2) Date: Dec. 28, 2015

(87) PCT Pub. No.: WO2015/002637
PCT Pub. Date: Jan. 8, 2015

(65) Prior Publication Data
US 2016/0146154 A1    May 26, 2016

(51) Int. Cl.
*F02K 1/80* (2006.01)
*F02K 1/70* (2006.01)
*F16B 2/08* (2006.01)

(52) U.S. Cl.
CPC ............ *F02K 1/70* (2013.01); *F02K 1/80* (2013.01); *F16B 2/08* (2013.01); *F05D 2220/30* (2013.01); *F05D 2260/39* (2013.01)

(58) Field of Classification Search
CPC ... F02K 1/70; F02K 1/80; F02K 9/343; F05D 2260/30; F05D 2260/39; F05D 2220/30;
(Continued)

(56) References Cited

U.S. PATENT DOCUMENTS

| 2,679,993 | A |   | 6/1954 | Christophersen |
|-----------|---|---|--------|----------------|
| 3,029,095 | A | * | 4/1962 | King ............... F16L 23/10 24/279 |

(Continued)

FOREIGN PATENT DOCUMENTS

| CN | 1035878 A   | 9/1989 |
|----|-------------|--------|
| FR | 2900979 B1  | 6/2008 |

(Continued)

OTHER PUBLICATIONS

Notification of Reasons for Refusal issued in connection with corresponding JP Application No. 2016-523719 dated May 9, 2017.
(Continued)

*Primary Examiner* — Richard A Edgar
*Assistant Examiner* — Danielle M Christensen
(74) *Attorney, Agent, or Firm* — MRA Systems, Inc.; William Andes

(57) ABSTRACT

A turbofan engine having a fan, a fan casing surrounding the fan and having a first radial flange, a thrust reverser having a second radial flange, and a band clamp coupling the first and second radial flanges to connect the thrust reverser and the fan casing. The band clamp may be a segmented band clamp.

10 Claims, 9 Drawing Sheets

(58) Field of Classification Search
CPC .... F05D 2220/32; F05D 2250/38; F16B 2/08; F16L 19/06; F16L 21/007
See application file for complete search history.

(56) References Cited

U.S. PATENT DOCUMENTS

| | | | |
|---|---|---|---|
| 3,458,217 A | | 7/1969 | Pride et al. |
| 3,636,877 A | | 1/1972 | Eaton |
| 3,674,291 A | | 7/1972 | Goldberg |
| 3,861,723 A | | 1/1975 | Kunz et al. |
| 4,118,826 A | * | 10/1978 | Kaeser .................. A01G 1/125 15/328 |
| 4,468,842 A | | 9/1984 | Perry et al. |
| 4,715,565 A | | 12/1987 | Wittmann |
| 4,739,542 A | | 4/1988 | Krzesicki |
| 4,840,026 A | * | 6/1989 | Nash .................... F01D 25/265 285/330 |
| 4,951,973 A | | 8/1990 | Corsmeier |
| 4,969,923 A | | 11/1990 | Reeder et al. |
| 5,076,514 A | | 12/1991 | Melcher |
| 5,157,816 A | | 10/1992 | Huessler |
| 5,352,061 A | | 10/1994 | Robinson |
| 5,411,349 A | | 5/1995 | Hornung et al. |
| 5,470,114 A | | 11/1995 | Umney et al. |
| 5,645,303 A | | 7/1997 | Warehime et al. |
| 5,649,680 A | | 7/1997 | Andersson |
| 5,915,765 A | | 6/1999 | Sternberger |
| 6,076,467 A | | 6/2000 | Cespedosa et al. |
| 6,305,871 B1 | | 10/2001 | Lancho Doncel et al. |
| 6,403,873 B1 | | 6/2002 | Amaral et al. |
| 6,454,214 B1 | | 9/2002 | Smith |
| 6,648,543 B2 | | 11/2003 | Arulf |
| 7,320,485 B2 | | 1/2008 | Amendolea et al. |
| 7,922,125 B2 | | 4/2011 | Lancho Doncel |
| 2004/0118128 A1 | * | 6/2004 | Bruno ...................... F02C 7/32 60/801 |
| 2005/0264010 A1 | | 12/2005 | Wagner |
| 2006/0202480 A1 | | 9/2006 | Cassel et al. |
| 2008/0098720 A1 | | 5/2008 | Watson |
| 2010/0193628 A1 | | 8/2010 | Welch |
| 2011/0140415 A1 | | 6/2011 | Flynn et al. |
| 2012/0012711 A1 | | 1/2012 | Ross et al. |
| 2012/0304621 A1 | * | 12/2012 | Stuart .................. F01D 25/243 60/226.2 |

FOREIGN PATENT DOCUMENTS

| | | |
|---|---|---|
| JP | 2012-251556 A | 12/2012 |
| WO | 2012/049386 A1 | 4/2012 |
| WO | 2012095600 A1 | 7/2012 |

OTHER PUBLICATIONS

International Search Report dated May 9, 2014 which was issued in connection with PCT Patent Application No. PCT/US13/49041 which was filed on Jul. 2, 2013.

Unofficial English Translation of Chinese Office Action issued in connection with corresponding CN Application No. 201380077748.5 dated Jul. 29, 2016.

Machine translation and Japanese Notice of Allowance issued in connection with corresponding JP Application No. 2016523719 dated Oct. 24, 2017.

* cited by examiner

ENGINE AND BAND CLAMP

BACKGROUND

Contemporary aircraft engines may include a thrust reverser having a movable element that, when in the active position, reverses at least a portion of the air flow passing through the engine. The thrust reverser may be moveable with respect to the engine or separable from the engine to allow access to portions of the engine. A clamp may be used to secure part of the thrust reverser to the fan casing.

BRIEF DESCRIPTION

In one aspect, an embodiment of the innovation relates to a turbofan engine having a fan assembly, a fan casing surrounding the fan assembly and having a first radial flange, a thrust reverser having a second radial flange, and a band clamp coupling the first and second radial flanges to connect the thrust reverser and the fan casing.

In another aspect, an embodiment of the innovation relates to a band clamp for coupling a first radial flange and a second radial flange, having a segmented band clamp with the segments spaced from each other and configured to pre-load the first and second radial flanges in an axial direction, a first flexible cable set configured to provide a radial load on the segmented band clamp, a second flexible cable set redundant with the first flexible cable set and configured to provide a radial load on the segmented band clamp and latches for tightening the first flexible cable set and the second flexible cable set relative to the first and second radial flanges to generate the compressive force wherein the first and second flexible cable sets prevent asymmetrical loading on the segmented band clamps.

DETAILED DESCRIPTION

Figure 1:
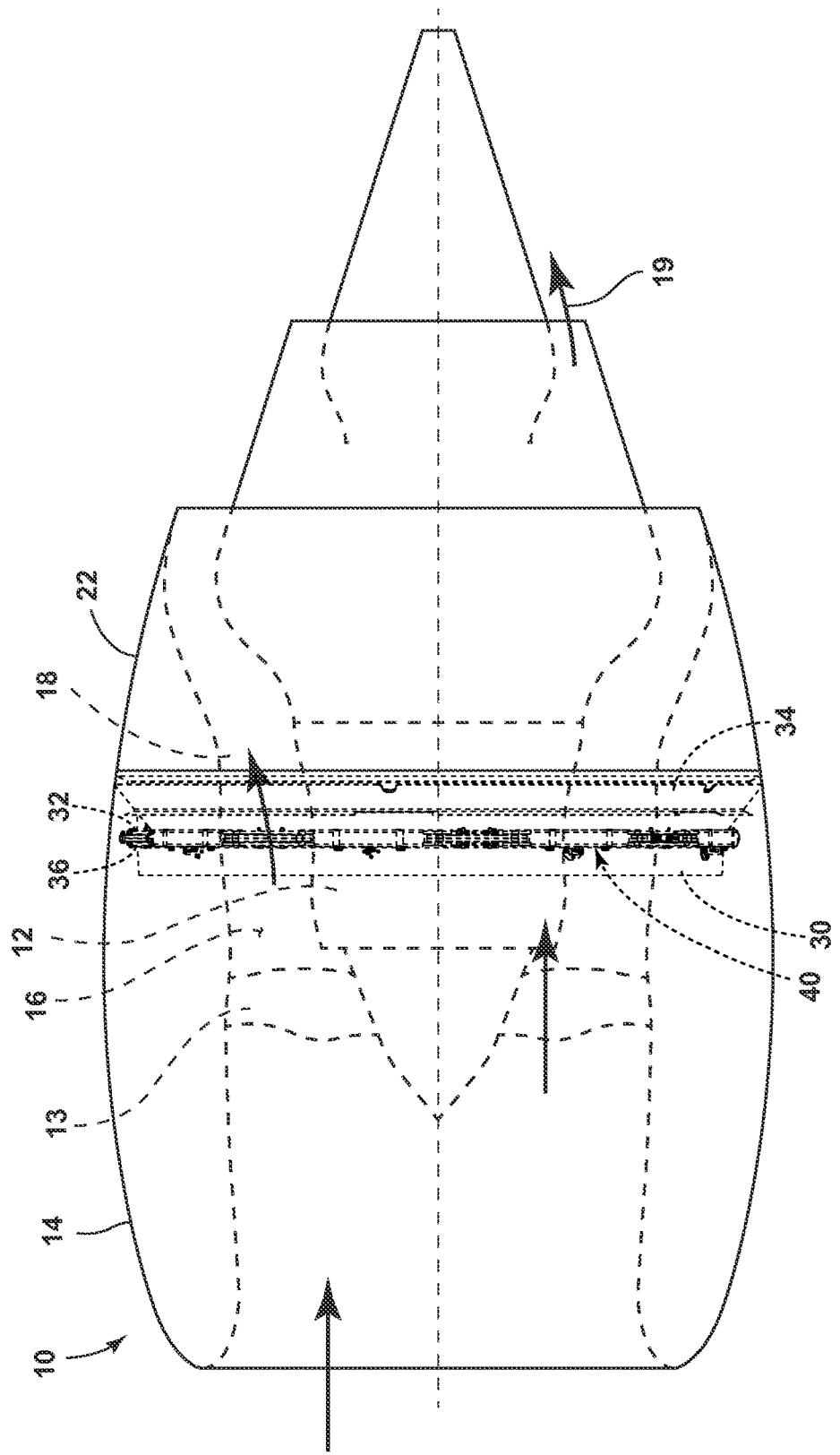
FIG. 1 is a schematic view of a turbofan jet engine with a portion of the outer nacelle cut away for clarity.

FIG. 1 illustrates a turbofan jet engine assembly 10 having a turbine engine 12, a fan assembly 13, and a nacelle 14. Portions of the nacelle 14 have been cut away for clarity. The nacelle 14 surrounds the turbine engine 12 and defines an annular air flow path or annular bypass duct 16 through the jet engine assembly 10 to define a generally forward-to-aft bypass air flow path as schematically illustrated by the arrow 18.

Figure 2:
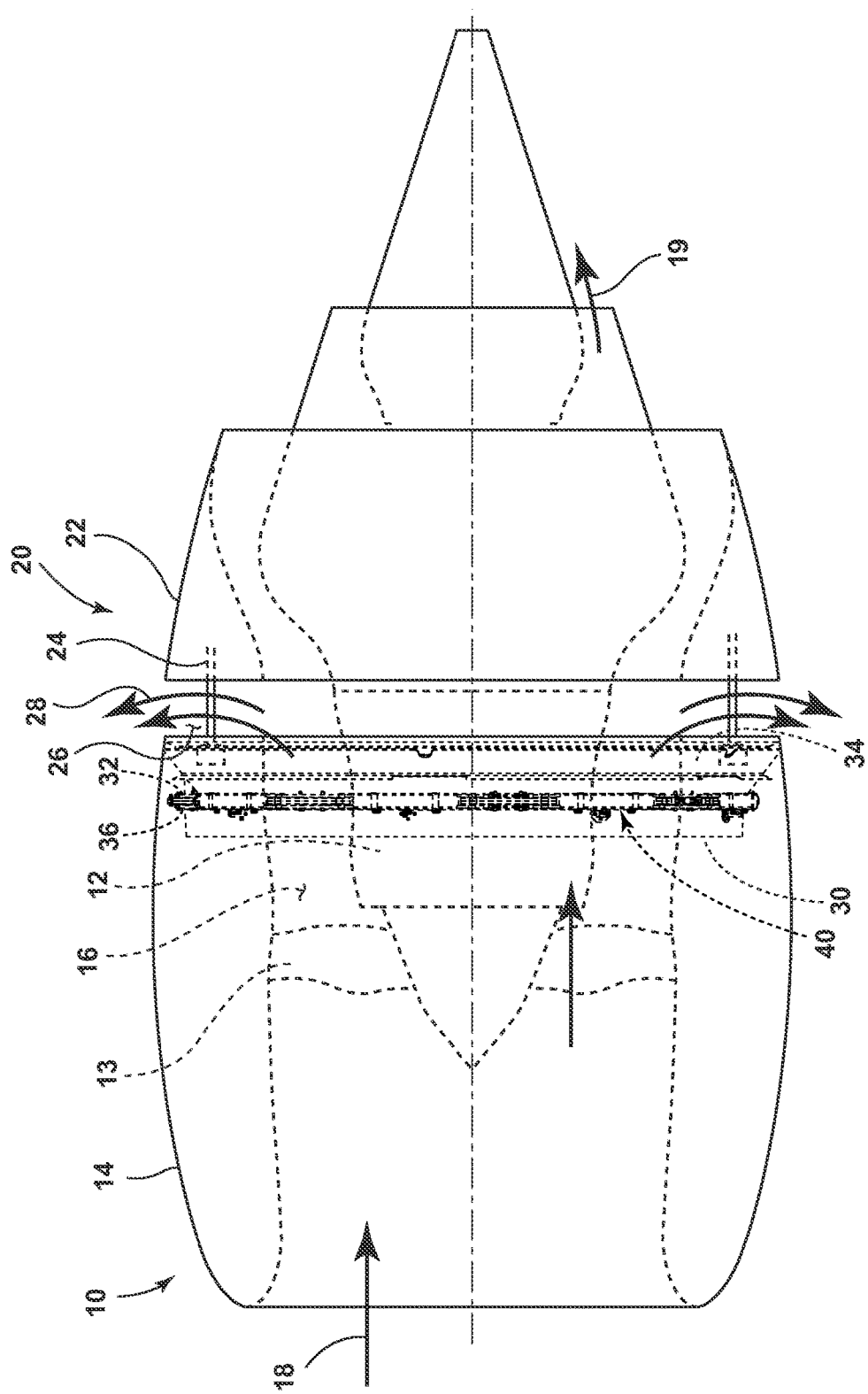
FIG. 2 is a schematic view of the engine of FIG. 1 with a thrust reverser shown in the operating position.

A thrust reverser with at least one movable element, which is movable to and from a reversing position, may be used to change the direction of the bypass airflow. In the reversing position the movable element may be configured to reverse at least a portion of the bypass air flow. There are several methods of obtaining reverse thrust on turbofan jet engine assemblies. In FIG. 2, one example of a thrust reverser 20 that may be used in the turbofan jet engine assembly 10 is illustrated as including at least one moveable control surface or movable element 22. The movable element 22 has been illustrated as a slidable portion of an outer cowling that is capable of axial motion with respect to the forward portion of the nacelle 14. An actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. The thrust reverser 20 changes the direction of the thrust force by reversing at least a portion of the bypass air flow.

The thrust reverser assembly 20 may be configured to separate from the nacelle 14 and translate aft to allow access to the turbine engine 12. A fixed structure of the thrust reverser assembly 20 may be operably coupled to a fixed structure such as the fan case. More specifically, a fan casing 30 having a first radial flange 32 that may surround the fan assembly 13 may be operably coupled to a portion of a thrust reverser 34 having a second radial flange 36. A band clamp 40 may operably couple the first radial flange 32 and the second radial flange 36 to connect the thrust reverser 20 and the fan casing 30.

Figure 3:
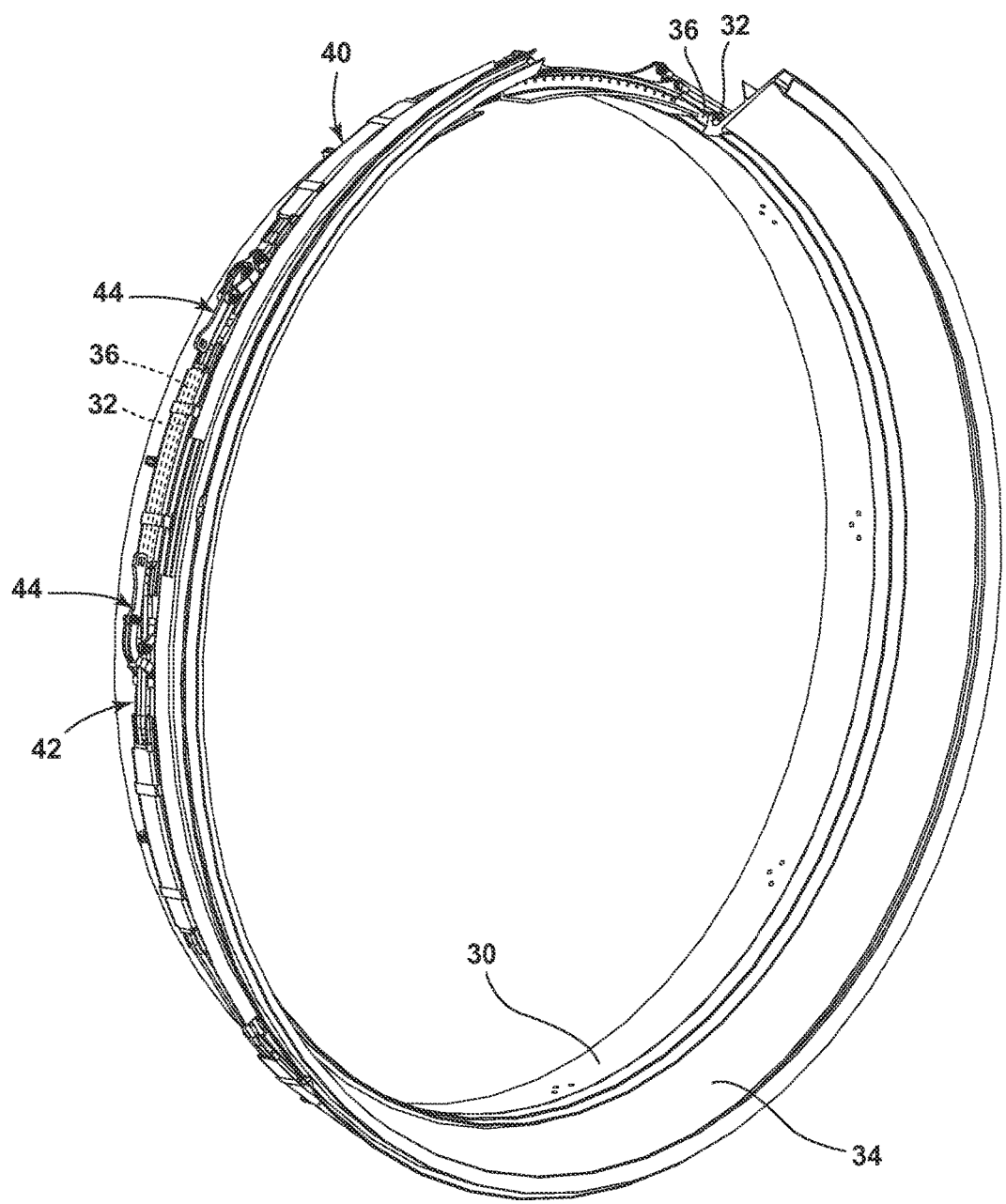
FIG. 3 is a perspective view of a portion of a fan case and a portion of a thrust reverser coupled together with a band clamp according to an embodiment of the innovation.

As shown in FIG. 3, both the portion of the fan casing 30 and the thrust reverser 34 have been illustrated as including two ring-type components. The portion of the thrust reverser 34 will be understood to be a fixed structure of a thrust reverser assembly. The fan casing 30 is a static structure within the nacelle 14 that surrounds the fan assembly 13 of the engine assembly 10. It will be understood that the ring-type components shown in the figures and identified as the fan casing 30 and fixed structure of the thrust reverser 34 are only portions of, respectively, a fan case and thrust reverser assembly typically found in the engine assembly 10. In particular, the component identified as the fan casing 30 may be a portion of the entire structure that forms a fan case within the nacelle 14 of the engine assembly 10, or a ring that is bolted or otherwise attached to a structure that together form a fan case of the engine 10. Similarly, the component identified as the fixed structure of the thrust reverser 34 may be a portion of the entire structure that forms the fixed structure or a ring that is bolted or otherwise attached to a structure that together form the fixed structure of the thrust reverser assembly. For ease of explanation, the components will simply be referred to as the fan casing 30 and the fixed structure of the thrust reverser 34.

The band clamp 40 may be used to couple the fan casing 30 and the fixed structure of the thrust reverser 34. The band clamp 40 is configured to couple the fan casing 30 and fixed structure of the thrust reverser 34 by simultaneously engaging the first radial flange 32 and the second radial flange 36.

Figure 4:
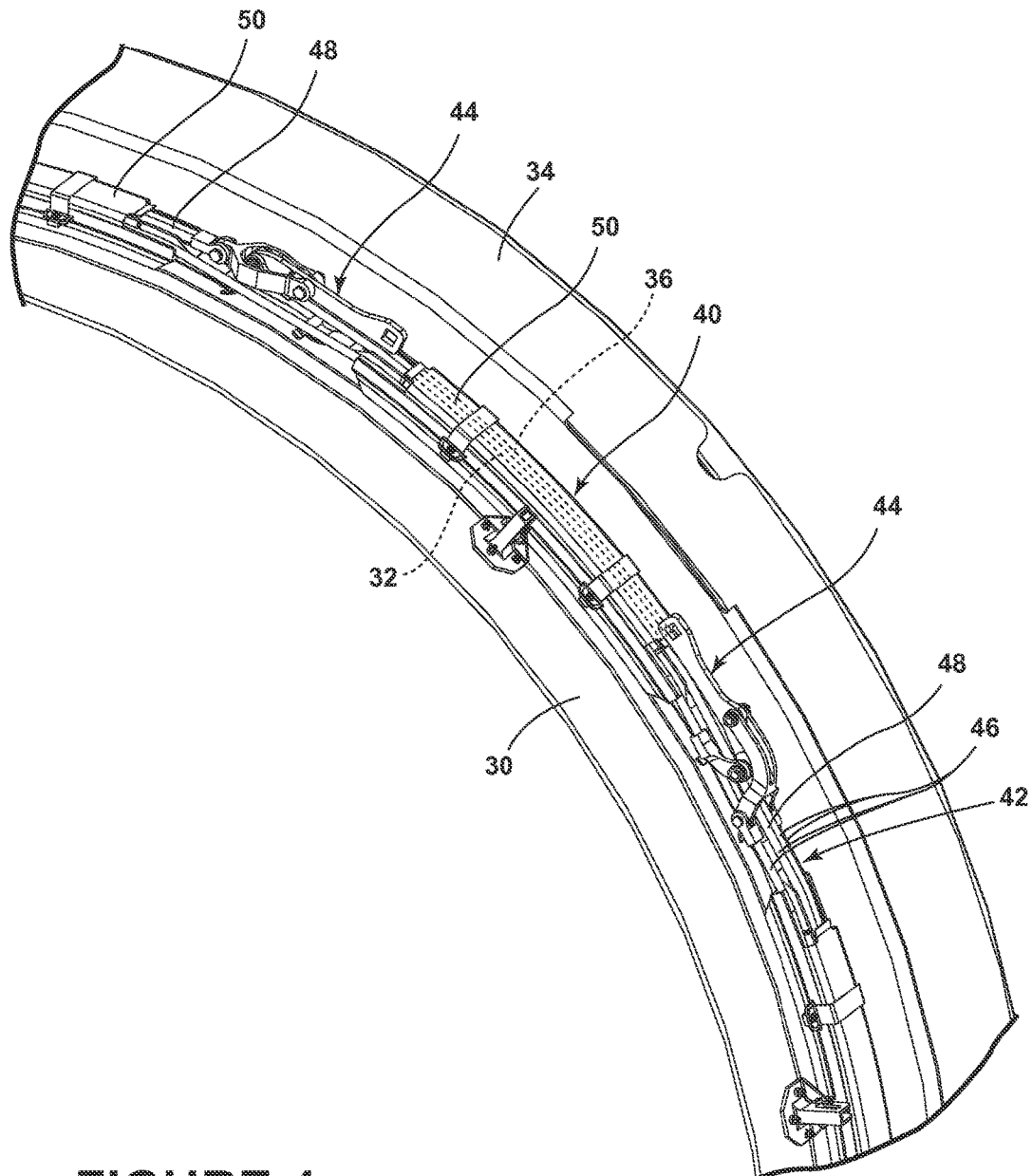
FIG. 4 is a partial perspective view of a portion of the fan case, thrust reverser, and band clamp of FIG. 3.

Referring to FIG. 4, the band clamp 40 may include a flexible band 42. The band 42 applies a radial force to the first and second radial flanges 32 and 36 to axially secure the first and second radial flanges 32 and 36 to each other. At least one latch 44 may be included for tightening the flexible band 42 relative to the first and second radial flanges 32 and 36 to generate a compressive force. The flexible band 42 may be formed from any suitable material and in any suitable manner including that the flexible band 42 may be formed by cables 46. The cables 46 may be made from any suitable material including wire cables. The flexible band 42 has been illustrated as a multi-segment band having multiple segments 48. In the case of the illustrated multi-segment band, each of the multiple segments 48 is connected by a latch 44. Further, the band clamp 40 has been illustrated as including a segmented band clamp including a series of discrete clamp segments 50 spaced around a circumference of the first and second radial flanges 32 and 36. The flexible band 42 is configured to provide a radial load on the discrete clamp segments 50.

Figure 5:
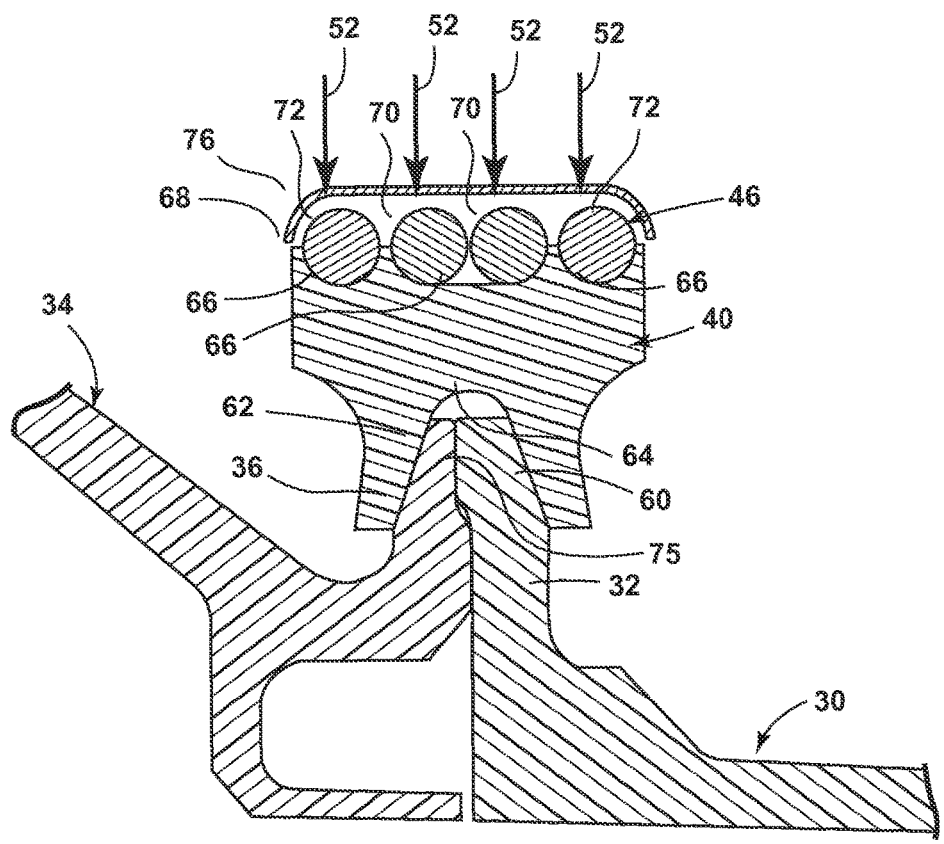
FIG. 5 is a cross-sectional view of a portion of the fan case, thrust reverser, and band clamp of FIG. 3.

Referring now to FIG. 5, the compressive force applied by the cables 46 has been schematically illustrated with arrows 52. The first and second radial flanges 32 and 36 may project in radially outward directions of the engine 10, so that the first and second radial flanges 32 and 36 lie in planes that are parallel to each other. The first and second radial flanges 32 and 36 have ramped surfaces 60 and 62, respectively, against which a corresponding portion of the band clamp 40 bears to convert the force from the flexible band 42 to an axial force between the first and second radial flanges 32 and 36. More specifically, the band clamp 40 has a v-shaped body 64 that bears against the ramped surfaces 60 and 62. The v-shaped body 64 also includes grooves 66 along its upper surface 68 to retain the cables 46. Any radial loads are transferred through the contact between the first and second radial flanges 32 and 36.

The cables 46 have been illustrated as including redundant cable sets that are configured to prevent asymmetrical loading on the v-shaped body 64. More specifically, a first flexible cable set 70 and a second flexible cable set 72 redundant with the first flexible cable set 70 are configured to provide a radial load on the segmented band clamp. As illustrated, the first flexible cable set 70 forms an inner cable set while the second flexible cable set 72 forms an outer cable set. In this manner both the first flexible cable set 70 and the second flexible cable set 72 are centered relative to the v-shaped body 64. If there was just one cable on each side of the body 64, when one of the cables failed, the compressive force would be solely on one side of the joint 75, which would cause the first and second radial flanges 32 and 36 to tend to separate and open the joint 75. However, in the illustrated example, should a failure occur with one of the flexible cable set 70 or flexible cable set 72 the remaining redundant flexible cable set will still provide symmetrical, radial loading on the v-shaped body 64. Further, a first latch 44 may be used for tensioning the first flexible cable set 70 and a separate latch 44 may be used for tensioning the second flexible cable set 72. In this manner, the latches are also redundant and the loss of either of the latches will not still allow for one of the flexible cable sets 70 or 72 to provide symmetrical, radial loading on the v-shaped body 64. A cable guard 76 may be included and may be formed by a metal clip operably coupled to the discrete clamp segment 50 to retain the cables 46 in the event of a cable failure.

Figure 6:
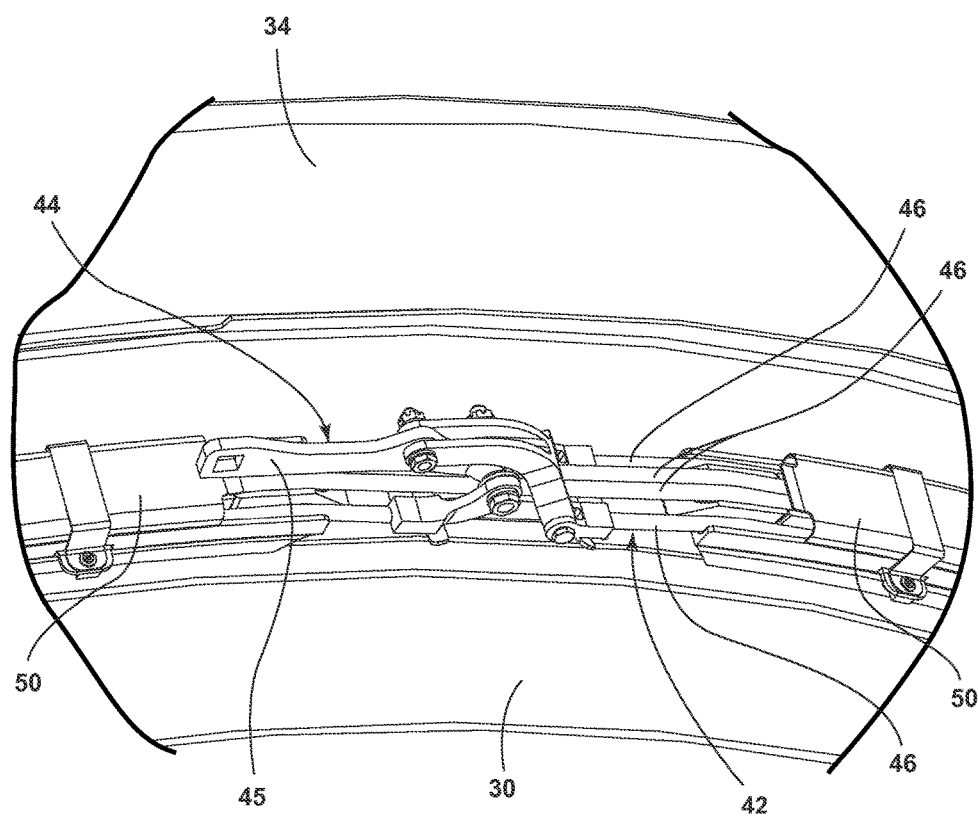
FIG. 6 is a partial perspective view of a portion of the fan case, thrust reverser, and band clamp of FIG. 3 with a latch in the closed position.

FIG. 6 illustrates one of the latches 44 for tightening one of the multiple segments 48. The latch 44 may be moved from a first position that may be thought of as a loose position to a second position or a tensioned position, as illustrated. The latch 44 may be an over-center latch. An operator may tighten the cables 46 by grasping a handle 45 that protrudes from the latch. Alternatively, a tool may be operably coupled to a portion of the handle 45 and may be used to move the latch 44 between the first and second positions. In the illustrated example, each of the first and second flexible cable sets comprise multi-segment cable sets 70 and 72 having segments with each segment connected by a latch 44 so that each segment may be tensioned. Alternatively, a T bolt and nut assembly may be used to tighten the flexible band 42.

Figure 7A:
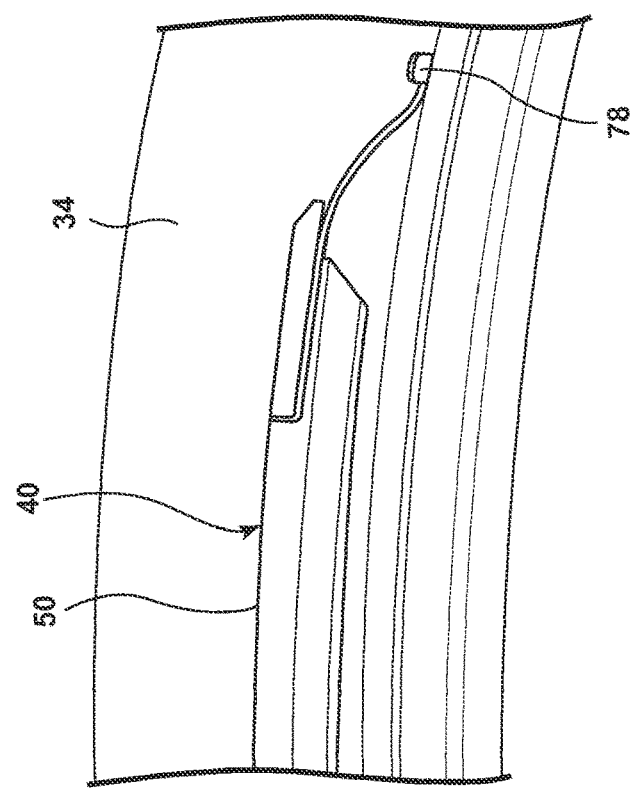
FIGS. 7A and 7B are side views of a portion of the band clamp of FIG. 3.
Figure 7B:
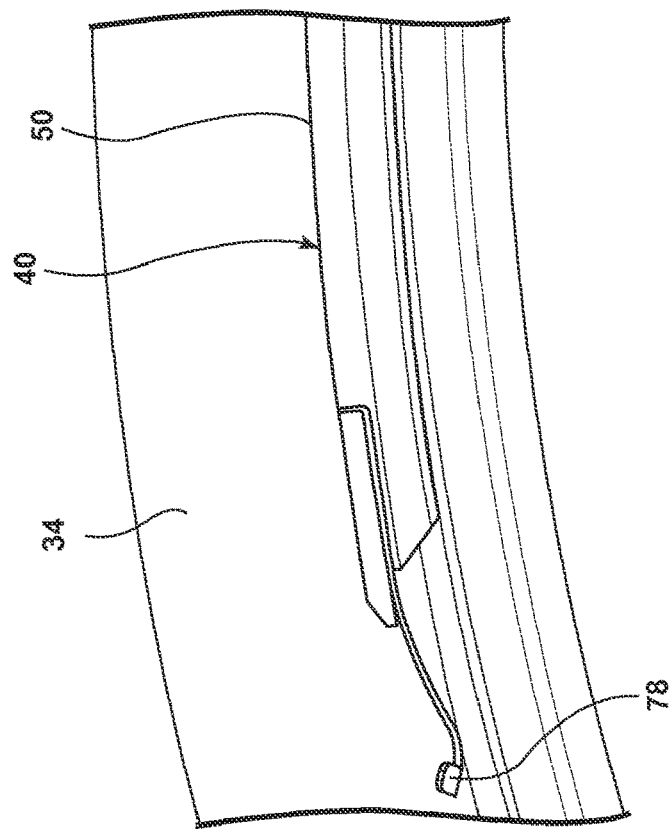

FIGS. 7A-7B are side views of a portion of a discrete clamp segment 50 and illustrate the operation of a spring 78. The spring 78 may be utilized to hold the discrete clamp segment 50 in a maintenance position. The discrete clamp segment 50 with the cables 46 preload is shown in FIG. 7A while FIG. 7B shows the discrete clamp segment 50 without the cables 46 preload. In both figures the cables 46 are removed to view the springs 78. The springs 78 may be located at each of the ends of each of the discrete clamp segment 50 to allow each of the discrete clamp segment 50 to lift free of the second radial flange 36 of the thrust reverser 34 when the cable preload is relieved as shown in FIG. 7B.

Figure 8:
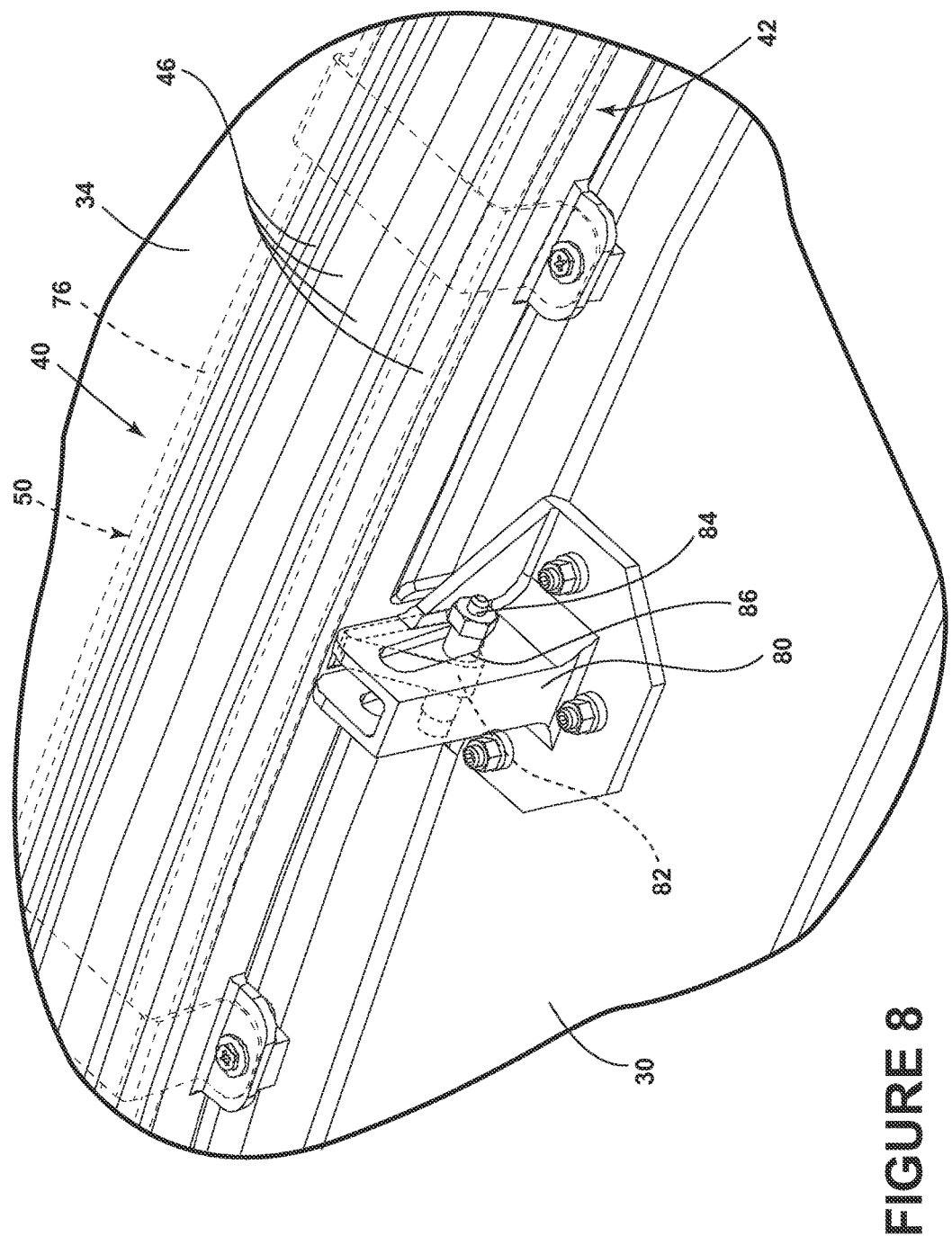
FIG. 8 is a partial perspective view of a portion of the fan case, thrust reverser, and band clamp of FIG. 3.

Referring to FIG. 8, the fan casing 30 has been illustrated as including a locator 80 that may be operably coupled to a portion 82 of one of the discrete clamp segments 50 to prevent rotation of the band clamp 40. More specifically, a pin 84 is retained within the portion 82, which is operably coupled to a portion of the discrete clamp segment 50 and a slot 86 is located in the locator 80. The pin 84 is retained within the slot 86 and prevents the rotation of the discrete clamp segment 50.

Figure 9:
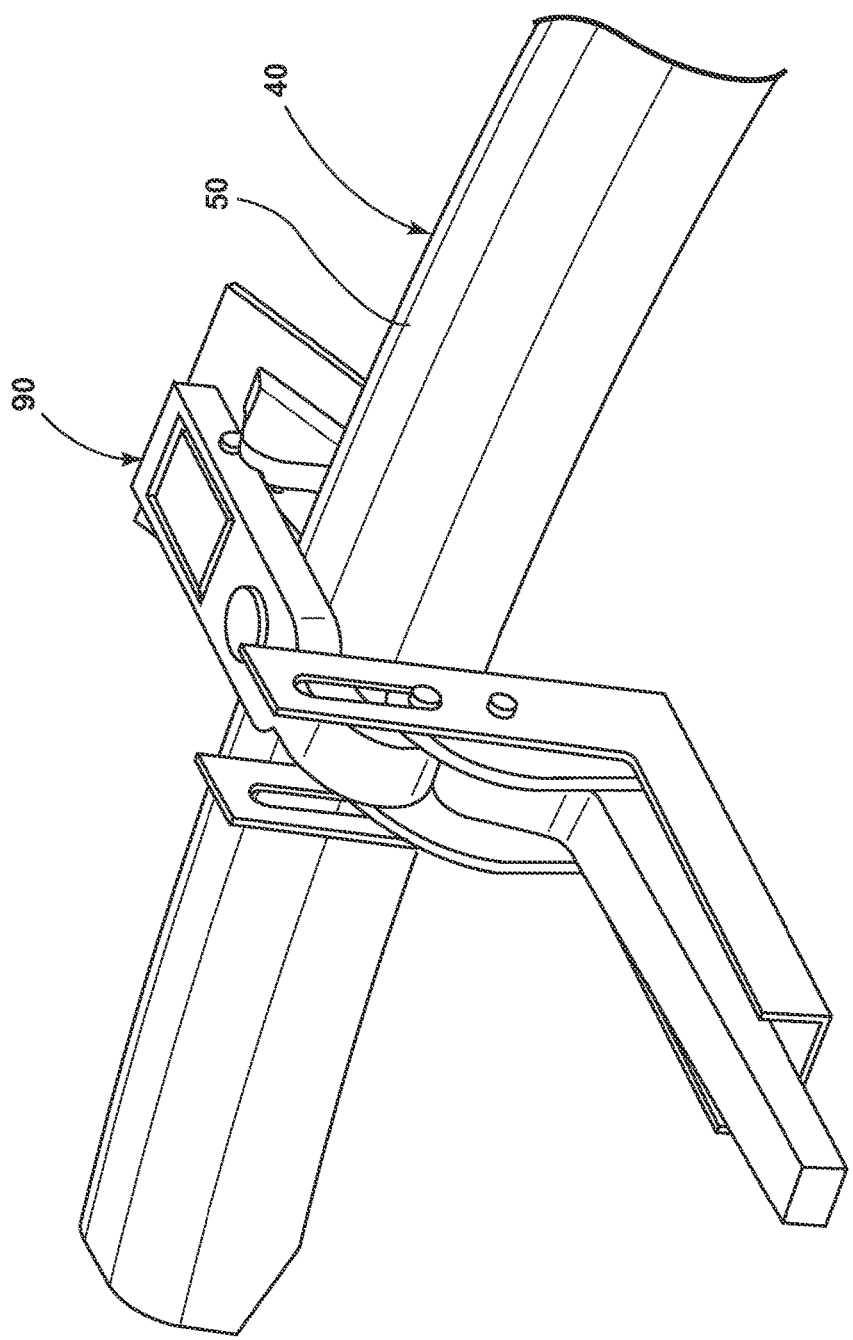
FIG. 9 is a partial perspective view of a latch that may be used with the band clamp of FIG. 3.

FIG. 9 illustrates a clamp 90 that may be used with one of the discrete clamp segment 50 to both prevent rotation of the band clamp 40 and to lift the discrete clamp segment 50 free of the second radial flange 36 of the thrust reverser 34 when the cable preload is relieved. The clamp 90 may also be used at each of the discrete clamp segments 50 to maintain clamping force if the cable preload is lost. For example, in the event of complete failure of both cable sets 70 and 72, the individual clamps 90 located at each segment 40 will retain individual segments.

While the band clamp has thus far been described with respect to use on a turbofan, it will be understood that the band clamp may be utilized in any appropriate setting for coupling a first radial flange and a second radial flange. Regardless of the use, the band clamp may include a segmented band clamp with the segments spaced from each other and configured to pre-load the first and second radial flanges in an axial direction, a first flexible cable set configured to provide a radial load on the segmented band clamp, a second flexible cable set redundant with the first flexible cable set and configured to provide a radial load on the segmented band clamp and latches for tightening the first flexible cable set and the second flexible cable set relative to the first and second radial flanges to generate the compressive force wherein the first and second flexible cable sets prevent asymmetrical loading on the segmented band clamps as illustrated and described above.

The embodiments described above provide for a variety of benefits including that the embodiments allow for attachment of the thrust reverser to the fan case of the accompanying turbofan engine. Further, the band clamp may be segmented to allow for customization depending on the engine installation. Hoop continuity is maintained through the use of a flexible band, which allows for flexibility during installation. Then tensioning of the flexible band results in a radial load on the clamp segments. In the event of loss of preload, two sets of parallel cables are run around the clamp segments, so that preload is maintained, even if one set of cables are lost. The above described embodiments are convenient to operate and provide levels of redundancy for retaining a secure connection even in the event of a failure of one or more of the cables. The redundancy provided will simplify certification efforts for any design using this clamp.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbofan engine comprising:
    a fan assembly;
    a fan casing surrounding the fan assembly and having a first radial flange;
    a thrust reverser having a second radial flange; and
    a band clamp coupling the first and second radial flanges to connect the thrust reverser and the fan casing;
    wherein the band clamp comprises at least one latch for tightening the band clamp relative to the first and second radial flanges to generate a compressive force and a band, the band is formed of cables which include redundant cable sets that are configured to prevent asymmetrical loading, and a body having grooves to retain the redundant cable sets; and
    wherein the redundant cable sets comprise inner and outer cable sets that are both centered relative to the band body.

2. The turbofan engine of claim 1 wherein the band clamp applies a radial force to the first and second radial flanges to axially hold the first and second radial flanges.

3. The turbofan engine of claim 2 wherein the first and second radial flanges have ramped surfaces against which a corresponding portion of the band clamp bears to convert the radial force from the band clamp to an axial force between the first and second radial flanges.

4. The turbofan engine of claim 1 wherein the band is a multi segment band, with each segment of the multi-segment band connected to a latch.

5. The turbofan engine of claim 4 wherein each latch comprises an over-center latch.

6. The turbofan engine of claim 1 wherein separate latches are used for tightening the inner cable set and the outer cable set.

7. The turbofan engine of claim 1 wherein the band clamp comprises a segmented band clamp and where the cables are configured to provide a radial load on the segmented band clamp.

8. The turbofan engine of claim 7 wherein the segmented band clamp comprises a series of discrete clamp segments spaced around a circumference of the first and second radial flanges.

9. The turbofan engine of claim 1 wherein the fan casing further comprises a locator that may be operably coupled to a portion of the band clamp to prevent rotation of the band clamp.

10. A band clamp for coupling a first radial flange and a second radial flange, comprising:
    a segmented band clamp with the segments spaced from each other and configured to pre-load the first and second radial flanges in an axial direction;
    a first flexible cable set configured to provide a radial load on the segmented band clamp;
    a second flexible cable set redundant with the first flexible cable set and configured to provide a radial load on the segmented band clamp;
    a first latch for tightening the first flexible cable set relative to the first and second radial flanges to generate the compressive force; and
    a second latch for tightening the second flexible cable set relative to the first and second radial flanges to generate the compressive force;
    wherein the first and second flexible cable sets prevent asymmetrical loading on the segmented band clamp.

* * * * *